(12) United States Patent
Sugiyama et al.

(10) Patent No.: US 8,374,467 B2
(45) Date of Patent: Feb. 12, 2013

(54) OPTICAL DEVICE HAVING A PLURALITY OF MACH-ZEHNDER MODULATORS

(75) Inventors: Masaki Sugiyama, Kawasaki (JP);
Yoshihiko Yoshida, Kawasaki (JP);
Akira Ishii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 310 days.

(21) Appl. No.: 12/719,905

(22) Filed: Mar. 9, 2010

(65) Prior Publication Data

US 2010/0232737 A1    Sep. 16, 2010

(30) Foreign Application Priority Data

Mar. 16, 2009 (JP) .................. 2009-063318

(51) Int. Cl.
*G02F 1/035* (2006.01)
*G02B 6/12* (2006.01)

(52) U.S. Cl. ............................. 385/2; 385/14

(58) Field of Classification Search .............. 385/2, 3, 385/4, 14, 16; 398/192, 186–188, 195, 197, 398/198
See application file for complete search history.

(56) References Cited

U.S. PATENT DOCUMENTS 5,995,685 A * 11/1999 Seino ................... 385/3
7,400,787 B2 * 7/2008 Burns ................... 385/3
2008/0212915 A1  9/2008 Ichikawa et al.
2009/0041472 A1  2/2009 Kawanishi et al.

FOREIGN PATENT DOCUMENTS

| JP | 1-287623 | 11/1989 |
| JP | 5-297332 | 11/1993 |
| JP | 2007-57785 | 3/2007 |
| JP | 2008-116865 | 5/2008 |

OTHER PUBLICATIONS

Japanese Office Action issued Sep. 25, 2012 in corresponding Japanese Patent Application No. 2009-063318.

* cited by examiner

*Primary Examiner* — Akm Enayet Ullah
(74) *Attorney, Agent, or Firm* — Staas & Halsey LLP

(57) ABSTRACT

There is provided an optical device including a plurality of Mach-Zehnder modulators; and an input branching waveguide to split an input light so as to direct the resulting light to the plurality of Mach-Zehnder modulators; the Mach-Zehnder modulator comprising: a splitter coupled to the input branching waveguide; pair of waveguides coupled to the splitter; a combiner coupled to the pair of waveguides; and a signal electrode to apply signals to the pair of waveguides; wherein the splitters are disposed in a different orientation to each other.

21 Claims, 14 Drawing Sheets

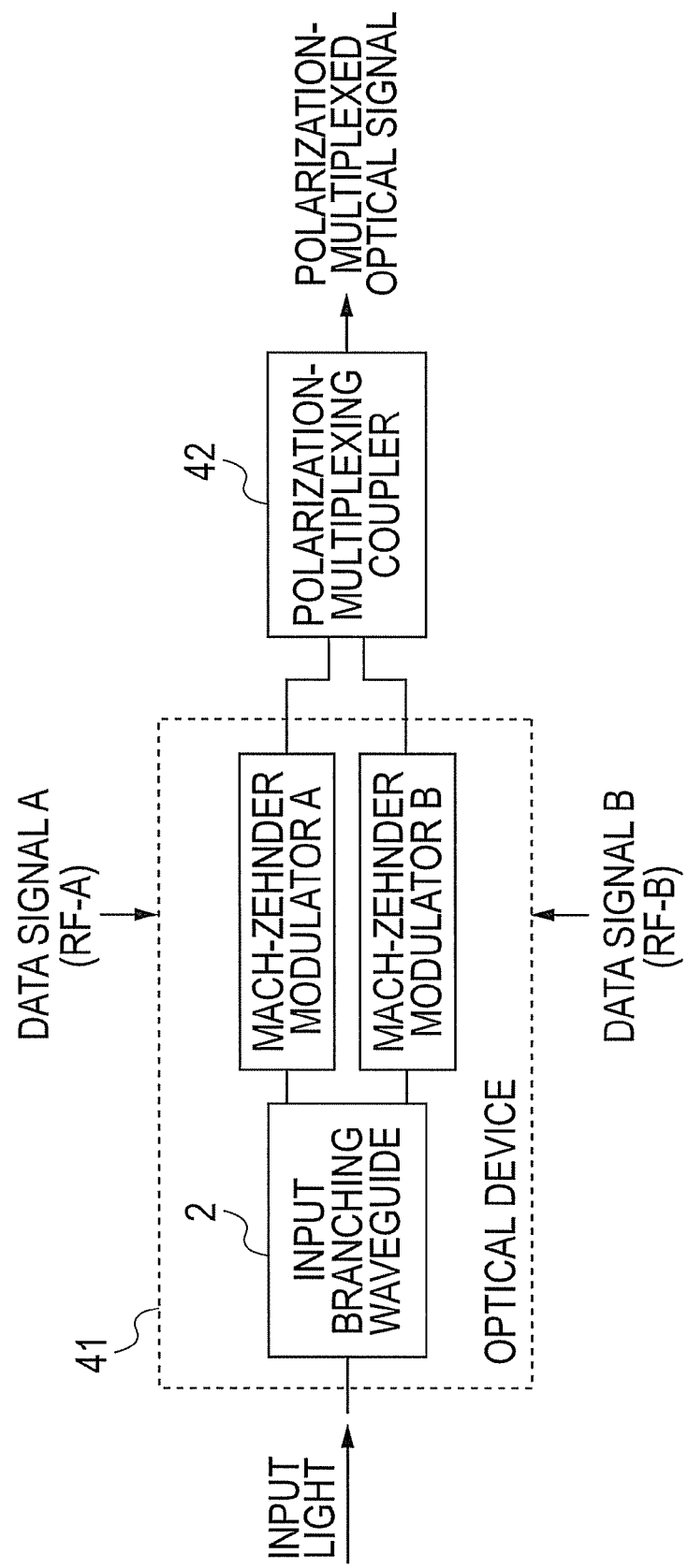

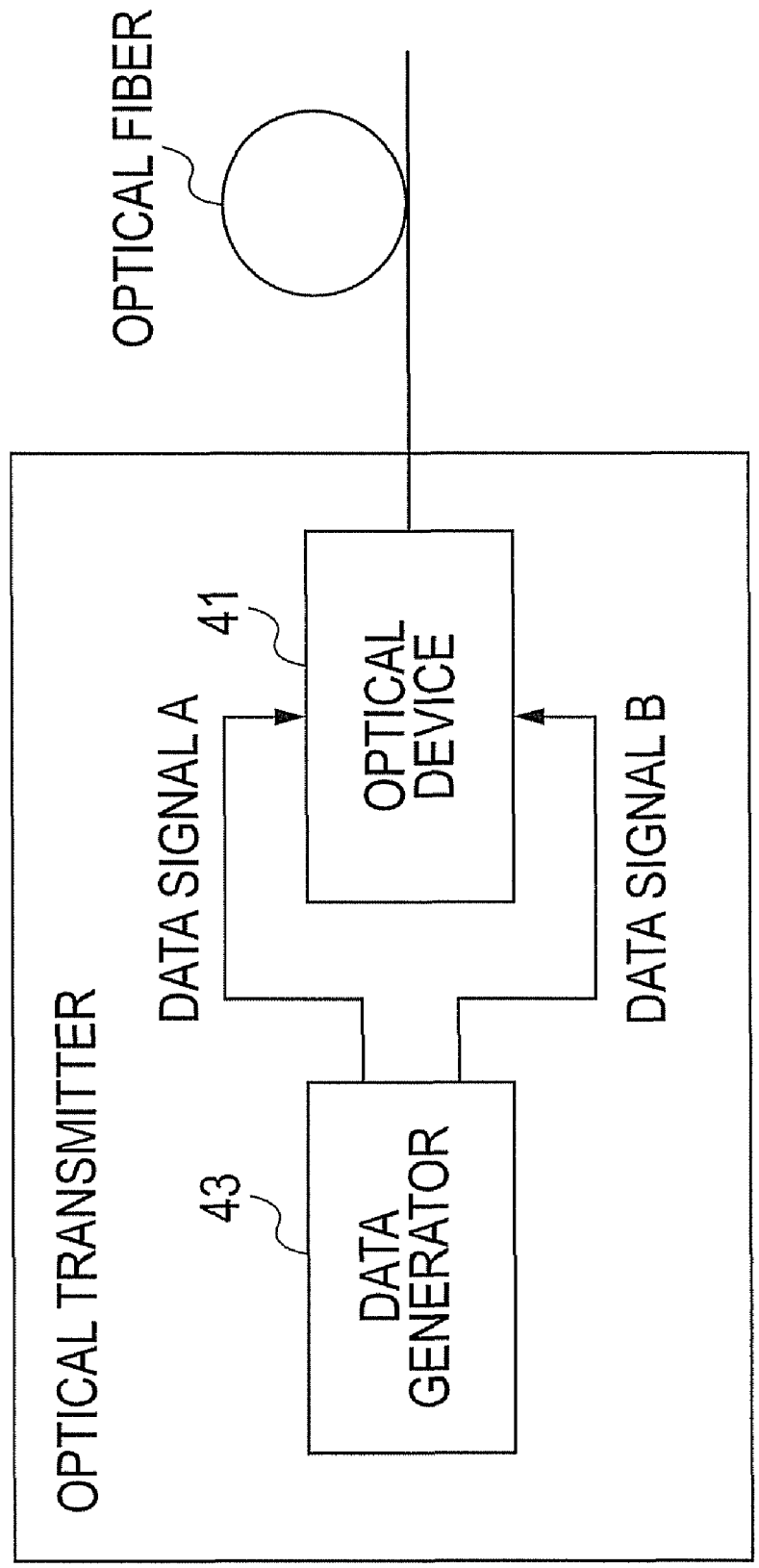

OPTICAL DEVICE HAVING A PLURALITY OF MACH-ZEHNDER MODULATORS

CROSS-REFERENCE TO RELATED APPLICATION

This application is based upon and claims the benefit of priority of the prior Japanese Patent Application No. 2009-063318, filed on Mar. 16, 2009, the entire contents of which are incorporated herein by reference.

FIELD

The embodiments discussed herein are related to an optical device including a plurality of Mach-Zehnder modulators.

BACKGROUND

An optical transmitter used in an optical communication system generally includes an optical modulator for modulating a carrier light in accordance with transmission data. An optical modulator configured to include a Mach-Zehnder modulator is known.

FIG. 1 is a diagram illustrating the configuration of a typical Mach-Zehnder modulator. In FIG. 1, an optical waveguide is formed in a surface region of a substrate 100. The substrate 100 has an electro-optical effect. The optical waveguide includes a splitter 101, a pair of waveguides 102 (102a, 102b), and a combiner 103. The splitter 101 splits an input light and directs the resulting light to the pair of waveguides 102a and 102b. Each of the pair of waveguides 102a and 102b propagates the input light. The combiner 103 combines optical signals propagated through the pair of waveguides 102a and 102b. A signal electrode 104 is formed over one of the pair of waveguides 102a and 102b (in the example illustrated in FIG. 1, the pair of waveguide 102a). In the Mach-Zehnder modulator having the above configuration, a data signal is applied to the signal electrode 104. Then, the index of refraction of the pair of waveguides 102 is controlled and a change in the phase difference between the pair of waveguides 102a and 102b is caused by Mach-Zehnder interference. Therefore, an optical signal whose intensity has been modulated in accordance with the data signal is generated.

To increase the amount of data transmission using the optical communication system, transmission schemes that utilize a plurality of Mach-Zehnder modulators have recently been put into practical use. For example, multi-level modulation schemes such as quadrature phase-shift keying (QPSK) (including differential quadrature phase-shift keying (DQPSK)), polarization multiplexing, and other transmission techniques have been proposed. For reduction of the size of an optical transmitter, it is preferable that a plurality of Mach-Zehnder modulators are integrated on a single chip.

FIG. 2 is a diagram illustrating the configuration of an optical device including a plurality of Mach-Zehnder modulators. The optical device includes an input branching waveguide 111 and Mach-Zehnder modulators A and B. The input branching waveguide 111 splits an input continuous-wave (CW) light and directs the resulting light to the Mach-Zehnder modulators A and B. The configuration and operation of the Mach-Zehnder modulators A and B are basically similar to those described with reference to FIG. 1. Note that data signals RF-A and RF-B are applied to the Mach-Zehnder modulators A and B, respectively. Thus, the optical device generates a modulated light A corresponding to the data signal RF-A and a modulated light B corresponding to the data signal RF-B.

An optical device including a plurality of Mach-Zehnder modulators is disclosed in, for example, Japanese Laid-open Patent Publication Nos. 2008-116865 and No. 2007-57785. As a related technology, a Mach-Zehnder modulator having a configuration with improved characteristics without increasing the space between parallel portions of branching waveguides is disclosed in, for example, Japanese Laid-open Paten Publication No. 5-297332.

SUMMARY

According to an aspect of the embodiment, there is provided an optical device comprising: a plurality of Mach-Zehnder modulators; and an input branching waveguide to split an input light so as to direct the resulting light to the plurality of Mach-Zehnder modulators; the Mach-Zehnder modulator comprising: a splitter coupled to the input branching waveguide; the pair of waveguides coupled to the splitter; a combiner coupled to the pair of waveguides; and a signal electrode to apply signals to the pair of waveguides; wherein the splitters are disposed in a different orientation to each other.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 13 is a diagram illustrating the configuration of a polarization-multiplexing modulator; and FIG. 14 is a diagram illustrating the configuration of an optical transmitter.

DESCRIPTION OF EMBODIMENTS

In an optical device including a plurality of Mach-Zehnder modulators, interference occurs between the Mach-Zehnder modulators when they are arranged close to one another. Therefore, the Mach-Zehnder modulators are arranged in such a manner that optical waveguides are not close to one another. For example, in the configuration illustrated in FIG. 2, the space Dy between pair of waveguides 112A and 112B is designed so that the interference between the Mach-Zehnder modulators A and B may be reduced so as to be substantially negligible.

To increase the space Dy between the pair of waveguides 112A and 112B, the space between the splitter 113A of the Mach-Zehnder modulator A and the splitter 113B of the Mach-Zehnder modulator B is also increased. In this case, the length of the input branching waveguide 111 used to direct the input light to the Mach-Zehnder modulators A and B is increased. Specifically, the path length from a branching point E of the input branching waveguide 111 to a branching point Fa of the splitter 113A (or the path length from the branching point E to a branching point Fb of the splitter 113B) is increased. Thus, a distance Dx illustrated in FIG. 2 is increased, and it is difficult to reduce the size of the optical device.

Figure 1:
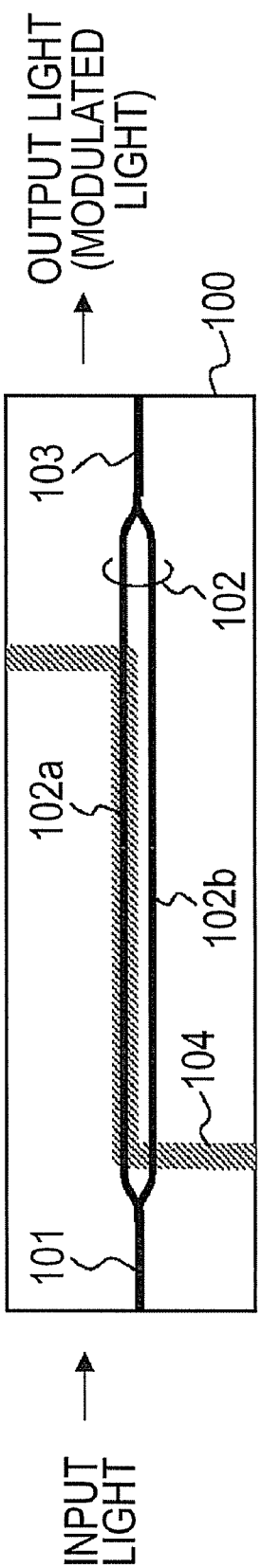
FIG. 1 is a diagram illustrating the configuration of a typical Mach-Zehnder modulator.
Figure 2:
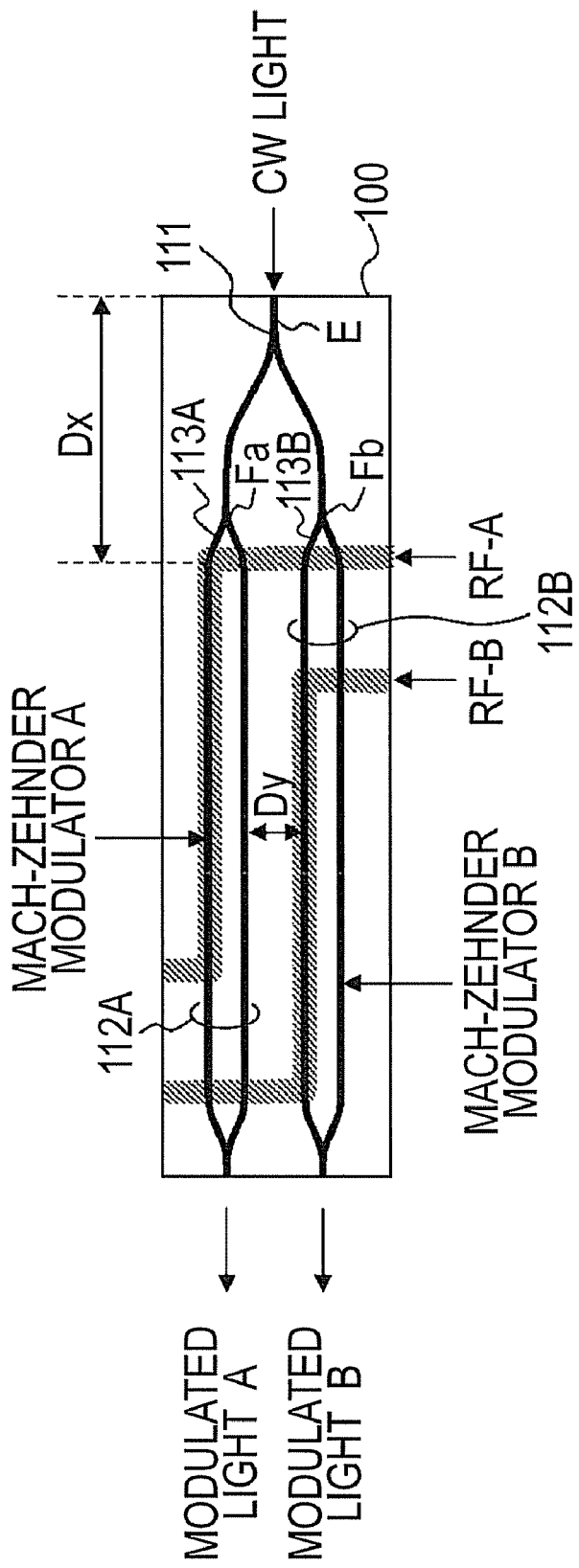
FIG. 2 is a diagram illustrating the configuration of an optical device including a plurality of Mach-Zehnder modulators.

To reduce the distance Dx illustrated in FIG. 2, for example, the curvature of optical waveguides extending from the branching point E to the branching points Fa and Fb may be increased. The increase in the curvature of the optical waveguides causes radiation loss. That is, the characteristics of the optical device are degraded. To reduce the size of the optical device, the length of the pair of waveguides 112A and 112B of the Mach-Zehnder modulators A and B may be reduced. The reduction in length of the pair of waveguides, however, reduces the interaction length (the length of an optical waveguide whose characteristics are controlled in accordance with a data signal applied thereto from a signal electrode), leading to a need for an increased drive voltage of the data signal. Therefore, the power consumption of the optical device or optical transmitter is increased and additional cost is required for a drive amplifier. In other words, it is necessary to increase the interaction length when the drive voltage is not increased, and it is difficult to reduce the size of the optical device.

First Embodiment

Figure 3:
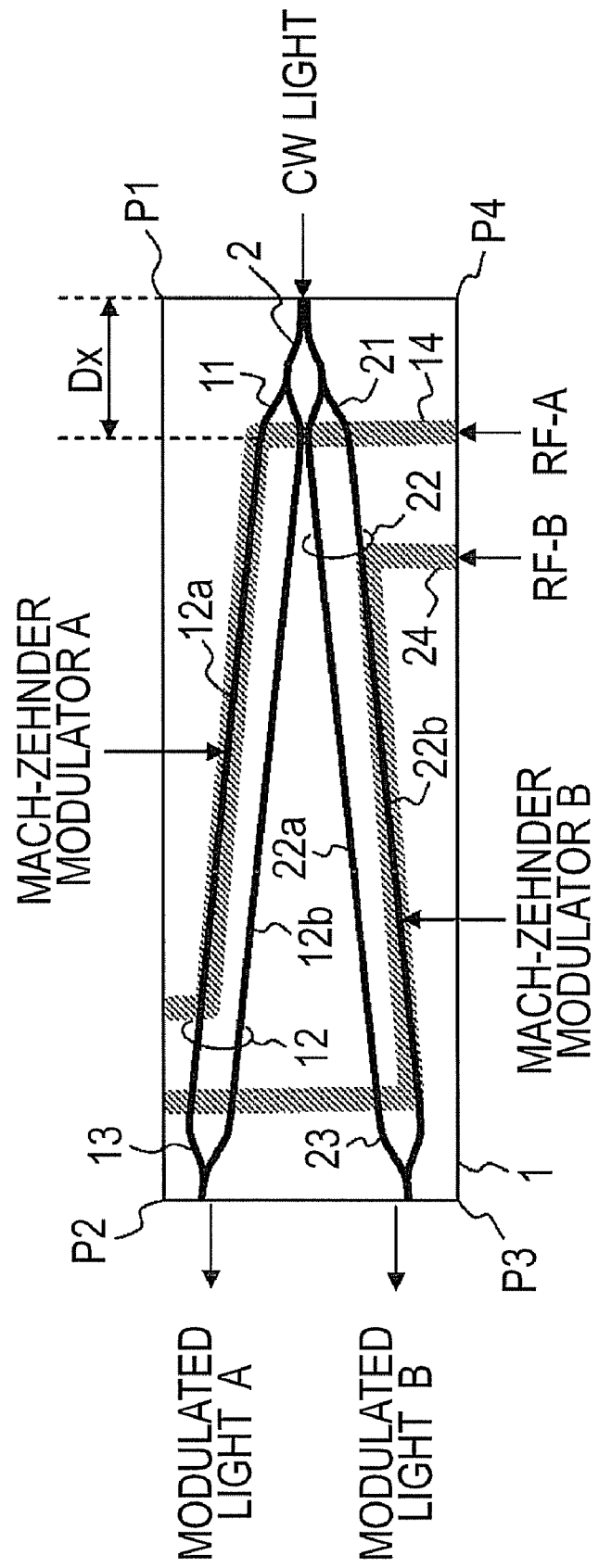
FIG. 3 is a diagram illustrating the configuration of an optical device according to a first embodiment.

FIG. 3 is a diagram illustrating the configuration of an optical device according to the first embodiment. In FIG. 3, a substrate 1 may be an electro-optical substrate having an electro-optical effect, of which optical characteristics (such as the index of refraction) change in accordance with an electrical signal applied thereto. The substrate 1 may also be implemented by, for example, an electro-optical crystal such as $LiNbO_3$ (LN) or $LiTaO_2$. In this embodiment, the substrate 1 may be rectangular.

The substrate 1 has a surface region in which an input branching waveguide 2 and Mach-Zehnder modulators A and B are disposed. The input branching waveguide 2 splits an input light and directs the resulting light to the Mach-Zehnder modulators A and B. The input branching waveguide 2 may be, for example, a Y branch coupler and may be configured to split the input light in a ratio of 1:1.

The Mach-Zehnder modulator A includes a splitter 11 that is coupled to the input branching waveguide 2, pair of waveguides 12 that are coupled to the splitter 11, and a combiner 13 that is coupled to the pair of waveguides 12. The splitter 11, the pair of waveguides 12, and the combiner 13 may not necessarily be separated from one another and, in this example, may form a continuous optical waveguide.

The splitter 11 is implemented by an optical waveguide, and receives a light split by the input branching waveguide 2. In this example, the splitter 11 may be a Y branch coupler, and may be configured to split the input CW light in a ratio of 1:1. The pair of waveguides 12 include a set of optical waveguides 12a and 12b that are parallel or substantially parallel to each other. Each of the optical waveguides 12a and 12b propagates the light output from the splitter 11. While the pair of waveguides 12 are configured such that the space between the optical waveguides 12a and 12b may be maintained substantially constant, the optical waveguides 12a and 12b may not necessarily be exactly parallel to each other. The combiner 13 is implemented by an optical waveguide. In this example, the combiner 13 may be a Y branch coupler, and may be configured to combine the light output from the optical waveguides 12a and 12b.

An optical waveguide may be formed by, for example, diffusing metal such as Ti into a surface region of the substrate 1. Alternatively, an optical waveguide may be formed on the surface of the substrate 1 by performing proton exchange in benzoic acid after patterning.

The Mach-Zehnder modulator A further includes a signal electrode 14 for applying a data signal to the pair of waveguides 12. The signal electrode 14 is formed along one of the optical waveguides 12a and 12b (in FIG. 3, along the optical waveguide 12a). In a case where the substrate 1 is a Z-cut substrate, the light are modulated with the use of changes in the index of refraction produced by the electric field in the Z-direction (the direction perpendicular to the substrate 1). In this case, the signal electrode 14 is formed immediately over the optical waveguide 12a.

The Mach-Zehnder modulator B has basically the same configuration as the Mach-Zehnder modulator A, and includes a splitter 21, a pair of waveguides 22 (a set of optical waveguides 22a and 22b), a combiner 23, and a signal electrode 24. A data signal RF-A is applied to the signal electrode 14 of the Mach-Zehnder modulator A, and a data signal RF-B is applied to the signal electrode 24 of the Mach-Zehnder modulator B.

Although not illustrated in FIG. 3, a ground electrode is formed in a region where the signal electrode 14 or 24 is not formed over the substrate 1. Since the signal electrode 14 is formed over the optical waveguide 12a, a ground electrode is formed over the optical waveguide 12b. Similarly, since the signal electrode 24 is formed over the optical waveguide 22b, a ground electrode is formed over the optical waveguide 22a. The signal electrodes 14 and 24 are connected to the ground electrodes via a terminating resistor. A coplanar electrode is implemented using the above configuration.

A buffer layer (not illustrated) is formed between the substrate 1 and the individual electrodes (the signal electrodes 14 and 24 and the ground electrodes). The buffer layer is provided to prevent the light traveling through the optical waveguides from being absorbed by the electrodes. The buffer layer may be formed of, for example, $SiO_2$ with a thickness of about 0.2 to 2.0 µm.

In the optical device having the above configuration, the Mach-Zehnder modulator A generates a modulated light A corresponding to the data signal RF-A applied to the signal electrode 14. The Mach-Zehnder modulator B generates a modulated light B corresponding to the data signal RF-B applied to the signal electrode 24. The modulated light A and B may be transmitted through independent optical fibers, or may be combined or multiplexed and then transmitted.

Figure 4:
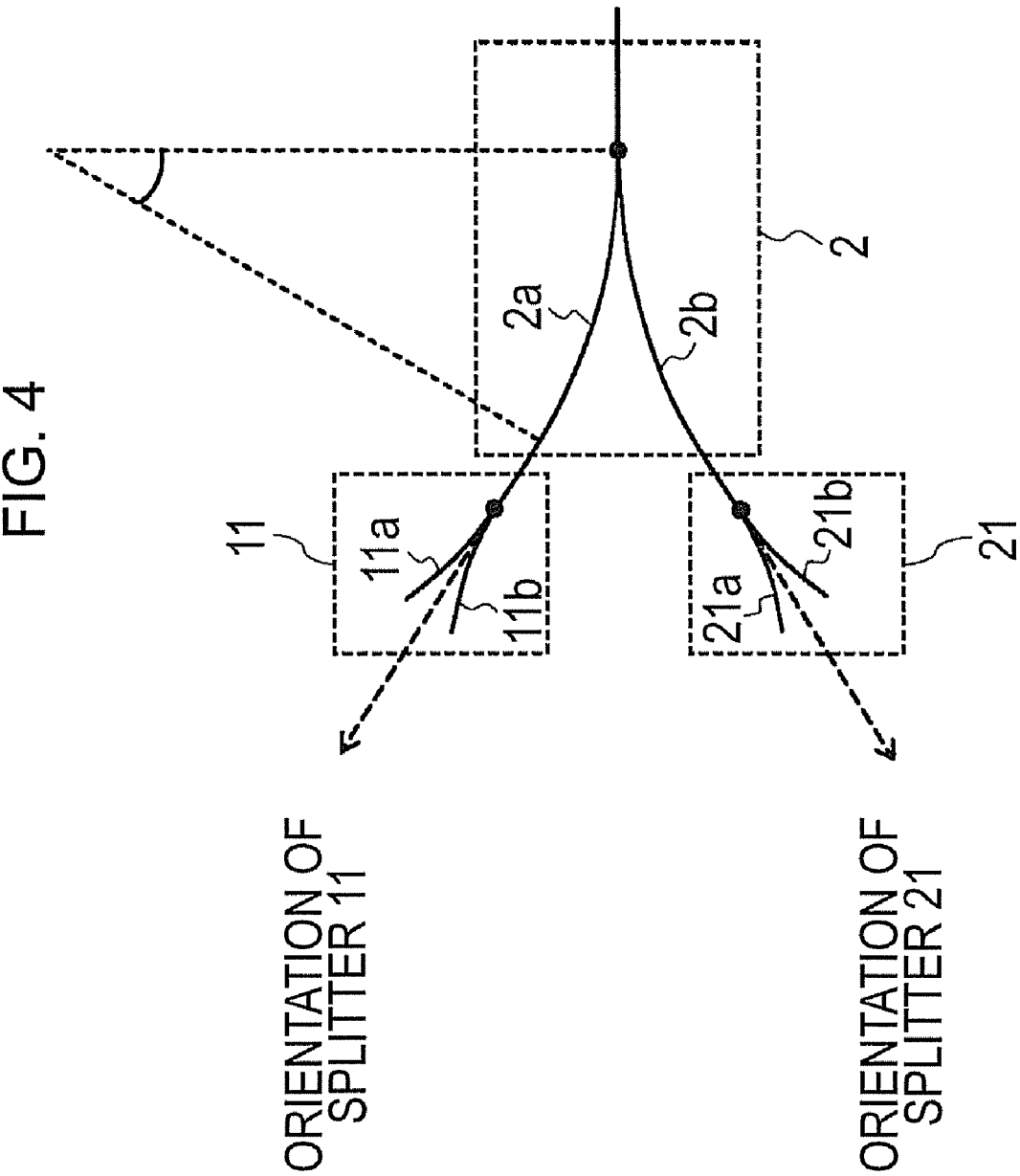
FIG. 4 is a schematic diagram illustrating the configuration of an input region of the optical device according to the first embodiment.

FIG. 4 is a diagram schematically illustrating the configuration of an input region of the optical device according to the first embodiment. In FIG. 4, the input branching waveguide 2 splits the input CW light and directs the resulting light to the Mach-Zehnder modulators A and B. One of the CW light is directed to the splitter 11 of the Mach-Zehnder modulator A through an optical waveguide 2a, and the other CW light is directed to the splitter 21 of the Mach-Zehnder modulator B through an optical waveguide 2b.

The optical waveguides 2a and 2b may be, but not particularly limited to, in this example, optical waveguides that are curved with the same curvature in directions opposite to each other. In this case, the curvature of the optical waveguides 2a and 2b is designed to be increased so that the radiation loss may be negligible. In general, when the curvature of an optical waveguide is higher than a predetermined threshold level, the radiation loss of the optical waveguide rapidly increases. The threshold level depends upon the materials making up the substrate 1 and the optical waveguide, the wavelength of light traveling through the optical waveguide, and so on. The optical waveguides 2a and 2b are not particularly limited but may be designed so that the curvature thereof can be as high as possible within a range lower than the threshold level.

The optical waveguide 2a is coupled to the splitter 11 of the Mach-Zehnder modulator A, and the splitter 11 splits the input CW light and outputs the resulting light through output waveguides 11a and 11b. Similarly, the optical waveguide 2b is coupled to the splitter 21 of the Mach-Zehnder modulator B, and the splitter 21 splits the input CW light and outputs the resulting light through output waveguides 21a and 21b. The output waveguides 11a and 11b are coupled to the output waveguides 12a and 12b, respectively, and the output waveguides 21a and 21b are coupled to the optical waveguides 22a and 22b, respectively.

In the optical device of the first embodiment, the orientations of the splitters 11 and 21 are different from each other. In this embodiment, the splitters 11 and 21 are formed so as to extend outward. The term "orientation of the splitter 11" (or "output direction of the splitter 11"), as used herein, means, but is not particularly limited to, for example, the incident direction of a light to the splitter 11 or an intermediate direction between the direction in which the output waveguide 11a extends and the direction in which the output waveguide 11b extends. The term "orientation of the splitter 21" (or "output direction of the splitter 21") means, but is not particularly limited to, for example, the incident direction of a light to the splitter 21 or an intermediate direction between the direction in which the output waveguide 21a extends and the direction in which the output waveguide 21b extends.

Referring back to FIG. 3, the pair of waveguides 12 are coupled to the splitter 11, and are formed so as to extend in the output direction of the splitter 11. Similarly, the pair of waveguides 22 are coupled to the splitter 21, and are formed so as to extend in the output direction of the splitter 21. That is, the Mach-Zehnder modulators A and B are disposed obliquely with respect to side surfaces of the substrate 1. Thus, as illustrated in FIG. 3, when the splitters 11 and 21 are formed close to each other, the space between the pair of waveguides 12 and 22 is small in a region near the splitters 11 and 21 and the space between the pair of waveguides 12 and 22 is large in a region away from the splitters 11 and 21. Note that the region where the space between the pair of waveguides 12 and 22 is small has a much smaller length than the pair of waveguides 12 and 22. In the region where the space between the pair of waveguides 12 and 22 is small, furthermore, no signal electrode is formed over at least one Mach-Zehnder modulator (in the embodiment, on the Mach-Zehnder modulator B). Therefore, there is no large interference between the Mach-Zehnder modulators A and B. The term "side surfaces of the substrate 1" means, in FIG. 3, the surface defined by a longer side P1-P2 of the substrate 1 and the surface defined by a longer side P3-P4 of the substrate 1.

In the optical device of the first embodiment, therefore, even when the splitters 11 and 21 are formed close to each other, the interference between the Mach-Zehnder modulators A and B is significantly small. In the configuration in which the splitters 11 and 21 are close to each other, as illustrated in FIG. 4, the length of the optical waveguides 2a and 2b may be reduced without increasing the curvature of the optical waveguides 2a and 2b. Specifically, in FIG. 3, the distance Dx from the input end of the substrate 1 to the splitters 11 and 21 is reduced, and the size of the optical device is reduced. Therefore, the size of the optical device may be reduced without reducing the performance of modulators.

In FIG. 3, preferably, the Mach-Zehnder modulators A and B have the same interaction length. The term "interaction length", as used herein, means the length of a region where the index of refraction of an optical waveguide is controlled in accordance with a data signal. The interaction length of the Mach-Zehnder modulator A corresponds to the length of a region where the signal electrode 14 overlaps the optical waveguide 12a, and the interaction length of the Mach-Zehnder modulator B corresponds to the length of a region where the signal electrode 24 overlaps the optical waveguide 22b. When the interaction lengths of the Mach-Zehnder modulators A and B are the same, for example, the drive voltages of the data signals RF-A and RF-B are the same, and therefore the configuration of a drive circuit may be simplified.

Second Embodiment

Figure 5:
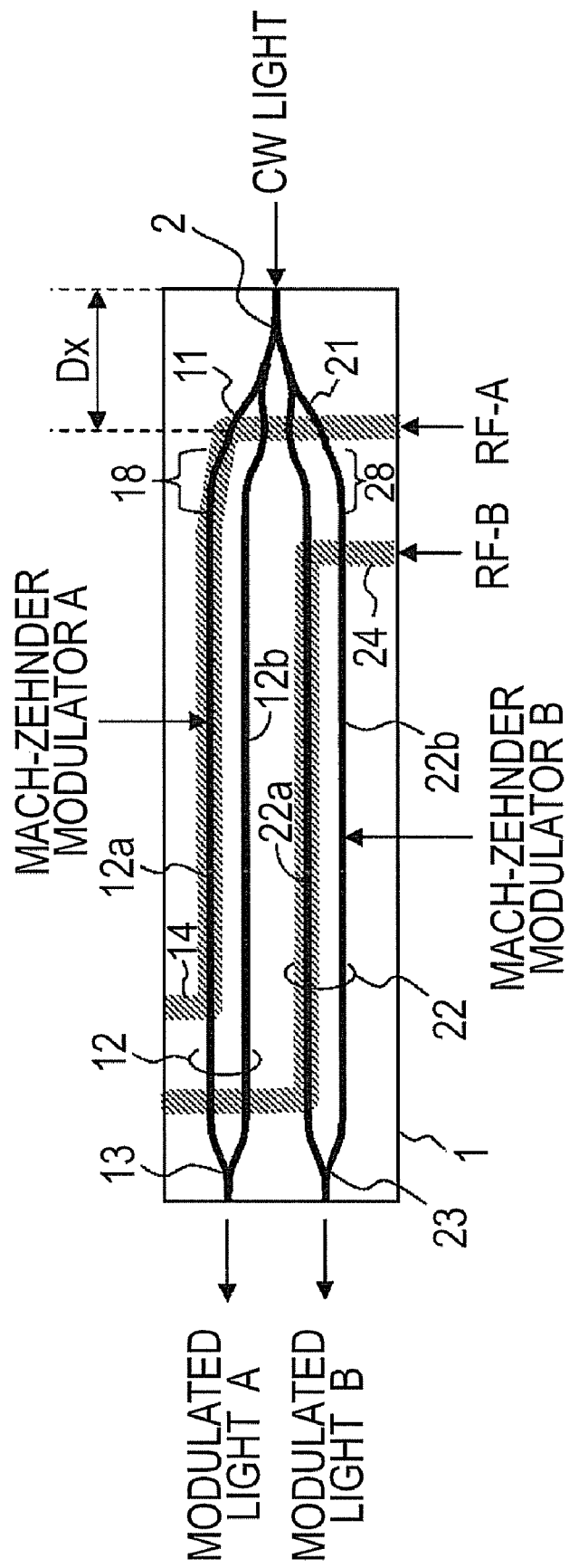
FIG. 5 is a diagram illustrating the configuration of an optical device according to a second embodiment.

FIG. 5 is a diagram illustrating the configuration of an optical device according to the second embodiment. In the second embodiment, Mach-Zehnder modulators A and B include pair of waveguides 12 and 22 that are curved in input regions 18 and 28 of the Mach-Zehnder modulators A and B, respectively, in such a manner that the pair of waveguides 12 are arranged in parallel or substantially in parallel to the pair of waveguides 22. The curvatures of the pair of waveguides 12 and 22 in the input regions 18 and 28 are not particularly limited but may be the same or substantially the same. In this example, further, the curvatures of the pair of waveguides 12 and 22 in the input regions 18 and 28 are constant.

In the configuration of the second embodiment, in contrast to that of the first embodiment illustrated in FIG. 3, the space between the Mach-Zehnder modulators A and B is not large even in a region near the output end of the optical device. In the configuration of the second embodiment, therefore, a substrate 1 whose width is small may be used. In the configuration illustrated in FIG. 5, furthermore, a signal electrode 14 is formed so as to extend in the input region 18 of the Mach-Zehnder modulator A. That is, in the Mach-Zehnder modulator A, the interaction region is formed so as to extend in a portion where the pair of waveguides 12 are curved. In a portion where the interaction region begins, therefore, the signal electrode 14 is formed so as to extend obliquely with respect to the side surfaces of the substrate 1. On the other hand, a signal electrode 24 is not formed in the input region 28 of the Mach-Zehnder modulator B. That is, in the Mach-Zehnder modulator B, the interaction region begins at the straight portion of the pair of waveguides 22. Thus, in a portion where the interaction region begins, the signal electrode 24 is formed so as to extend in parallel or substantially parallel to the side surfaces of the substrate 1. In the second embodiment, therefore, in the portion where the interaction region begins, the signal electrodes 14 and 24 extend in different directions between the Mach-Zehnder modulators A and B. With the use of the above configuration, a distance Dx illustrated in FIG. 5 may further be reduced.

Here, the configuration of the second embodiment is compared with the typical configuration illustrated in FIG. 2. In the second embodiment, the pair of waveguides 12 and 22 are disposed substantially in parallel to each other. Therefore, the substrate 1 in the second embodiment has the same width as the substrate 100 illustrated in FIG. 2. In the optical device of the second embodiment, as in the first embodiment, the distance Dx from the input end of the substrate 1 to the splitters 11 and 21 is smaller than that in the configuration illustrated in FIG. 2. In the second embodiment, accordingly, the size of the optical device may be reduced.

It is assumed that the substrates 1 and 100 have the same length. In this case, since the distance Dx in the optical device of the second embodiment is smaller than that in the configuration illustrated in FIG. 2, the interaction length of the second embodiment may be increased. Accordingly, the second embodiment achieves equivalent characteristics with a lower drive voltage.

Third Embodiment

Figure 6:
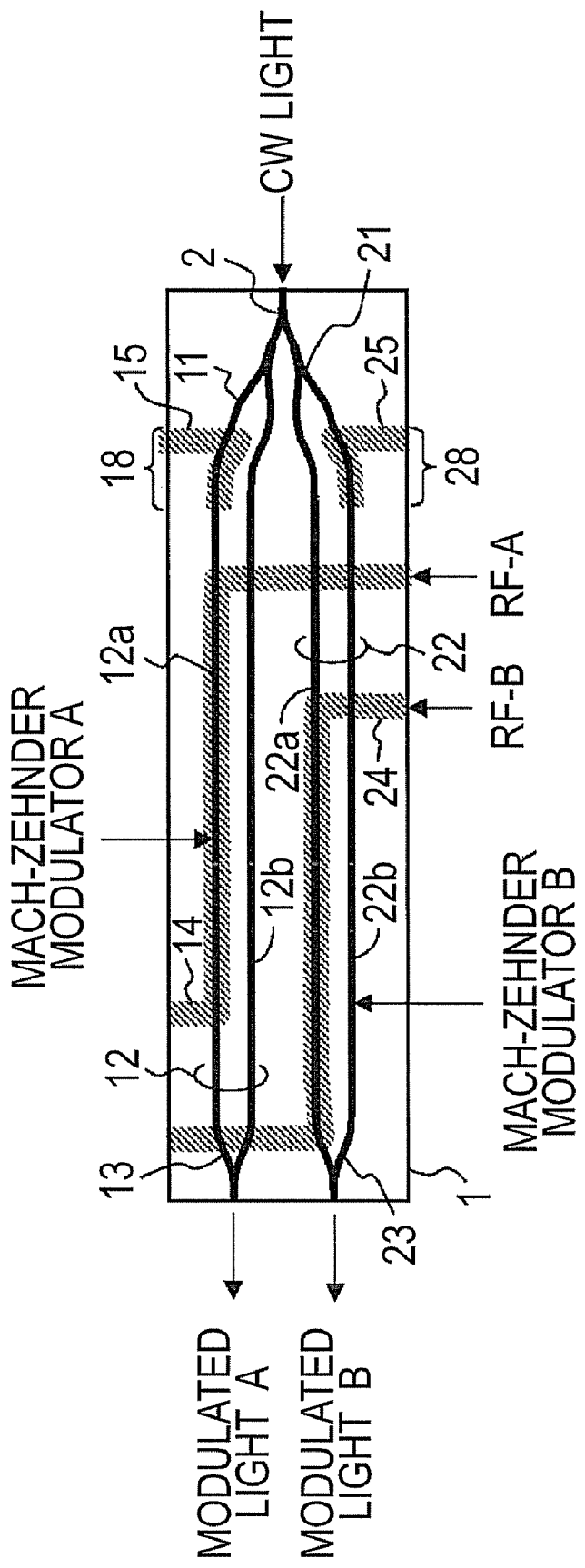
FIG. 6 is a diagram illustrating the configuration of an optical device according to a third embodiment.

FIG. 6 is a diagram illustrating the configuration of an optical device according to the third embodiment. In the third embodiment, each of Mach-Zehnder modulators A and B includes a direct-current (DC) electrode. In a Mach-Zehnder modulator, in general, in order to adjust the operating point (or to control the output of light to be in the off state), a DC bias voltage is controlled while the output of light is monitored. The DC bias voltage may also be multiplexed with a data signal and applied.

In the third embodiment, as illustrated in FIG. 6, a DC voltage is applied using DC electrodes 15 and 25 that are disposed separately from signal electrodes 14 and 24. In FIG. 6, the function for monitoring the output of the Mach-Zehnder modulators, the function for calculating a DC voltage in accordance with results of the monitoring, and the function for generating a DC voltage are not illustrated.

In the Mach-Zehnder modulator A, the DC electrode 15 is disposed on the input side of the signal electrode 14. The DC electrode 15 is formed so as to overlap an optical waveguide 12a in an input region 18. Similarly, the DC electrode 25 is formed so as to overlap an optical waveguide 22b in an input region 28.

In the optical device of the third embodiment, as in the second embodiment, since splitters 11 and 21 are close to each other, pair of waveguides 12 and 22 are also close to each other in the input regions 18 and 28, respectively. Accordingly, the DC electrode 15 of the Mach-Zehnder modulator A and the DC electrode 25 of the Mach-Zehnder modulator B are also close to each other. However, unlike a data signal, a DC voltage does not substantially induce interference between Mach-Zehnder modulators.

In the third embodiment, therefore, the DC electrodes 15 and 25 are disposed in the input regions 18 and 28 where the space between the Mach-Zehnder modulators A and B is small, respectively, and the signal electrodes 14 and 24 are disposed in straight regions where the space between the Mach-Zehnder modulators A and B is large. Therefore, a compact optical device may be achieved with reduced interference between the Mach-Zehnder modulators A and B.

Fourth Embodiment

Figure 7:
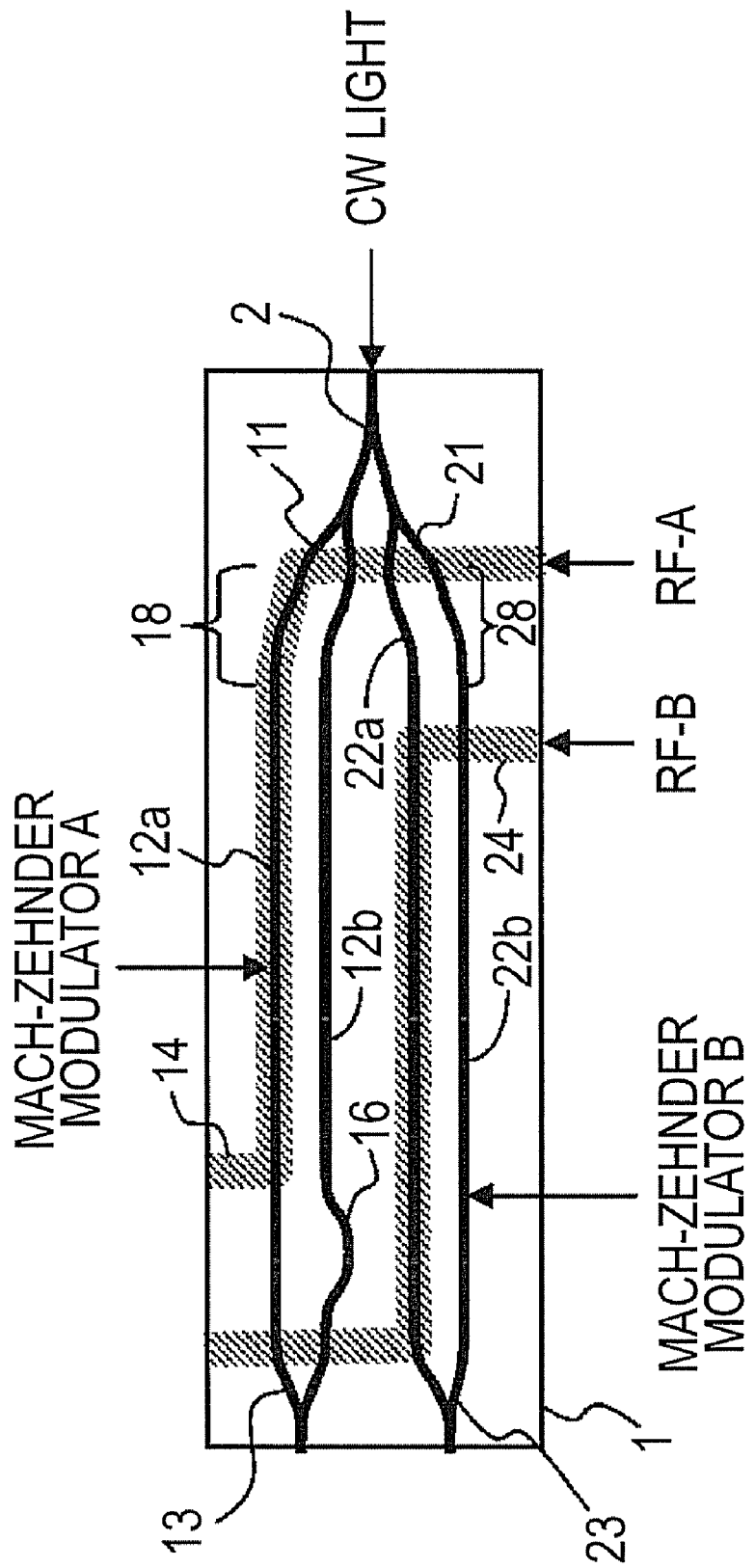
FIG. 7 is a diagram illustrating the configuration of an optical device according to a fourth embodiment.

FIG. 7 is a diagram illustrating the configuration of an optical device according to the fourth embodiment. In the fourth embodiment, an element for adjusting an optical path length between a set of arms of each Mach-Zehnder modulator is provided.

In the optical device of the fourth embodiment, as in the second and third embodiments, pair of waveguides 12 (12a, 12b) and 22 (22a, 22b) are curved in input regions 18 and 28 of Mach-Zehnder modulators A and B, respectively. Thus, a set of arms of each of the Mach-Zehnder modulators A and B have different optical path lengths. For example, in the Mach-Zehnder modulator A, an optical waveguide 12a located on the outer side thereof is longer than an optical waveguide 12b located on the inner side thereof. The difference in length of optical waveguide between the arms of a Mach-Zehnder modulator may prevent the DC bias point from being adjusted at a desired condition, and may degrade temperature characteristics.

The Mach-Zehnder modulator A includes a delay element 16 formed in one of the arms of the pair of waveguides 12 (in FIG. 7, in the optical waveguide 12b). The delay element 16 is implemented by, for example, bending the optical waveguide 12b in a region where a signal electrode 14 is not disposed. In this case, the delay element 16 is designed to compensate for, for example, the difference in optical path length between the optical waveguides 12a and 12b in the input region 18. In a case where the Mach-Zehnder modulator A includes a DC electrode, the delay element 16 may be formed in a region where the DC electrode is disposed.

The Mach-Zehnder modulator B is configured such that an optical waveguide 22a is shorter than an optical waveguide 22b. Accordingly, a combiner 23 is configured such that an optical waveguide coupled to the optical waveguide 22a may be longer than an optical waveguide coupled to the optical waveguide 22b. In this case, the curvature of the optical waveguide coupled to the optical waveguide 22a is set greater than the curvature of the optical waveguide coupled to the optical waveguide 22b. The difference in length between the two optical waveguides of the combiner 23 may be designed so that, for example, the difference in length between the optical waveguides 22a and 22b in the input region 28 may be compensated for.

In the fourth embodiment, therefore, since a set of arms of each Mach-Zehnder modulator have the same optical path length, the characteristics of the modulators may be improved with reduction in the size of the optical device. For example, when the lengths of optical waveguides in a set of arms of a Mach-Zehnder modulator are the same, the arms have equal loss so that the extinction ratio of the modulator is high. While in the example illustrated in FIG. 7, the Mach-Zehnder modulators A and B have different configurations, the Mach-Zehnder modulators A and B may have the same configuration. For example, each of the Mach-Zehnder modulators A and B may include a delay element. Alternatively, the Mach-Zehnder modulators A and B may include combiners that are asymmetric with respect to each other.

Fifth Embodiment

Figure 8:
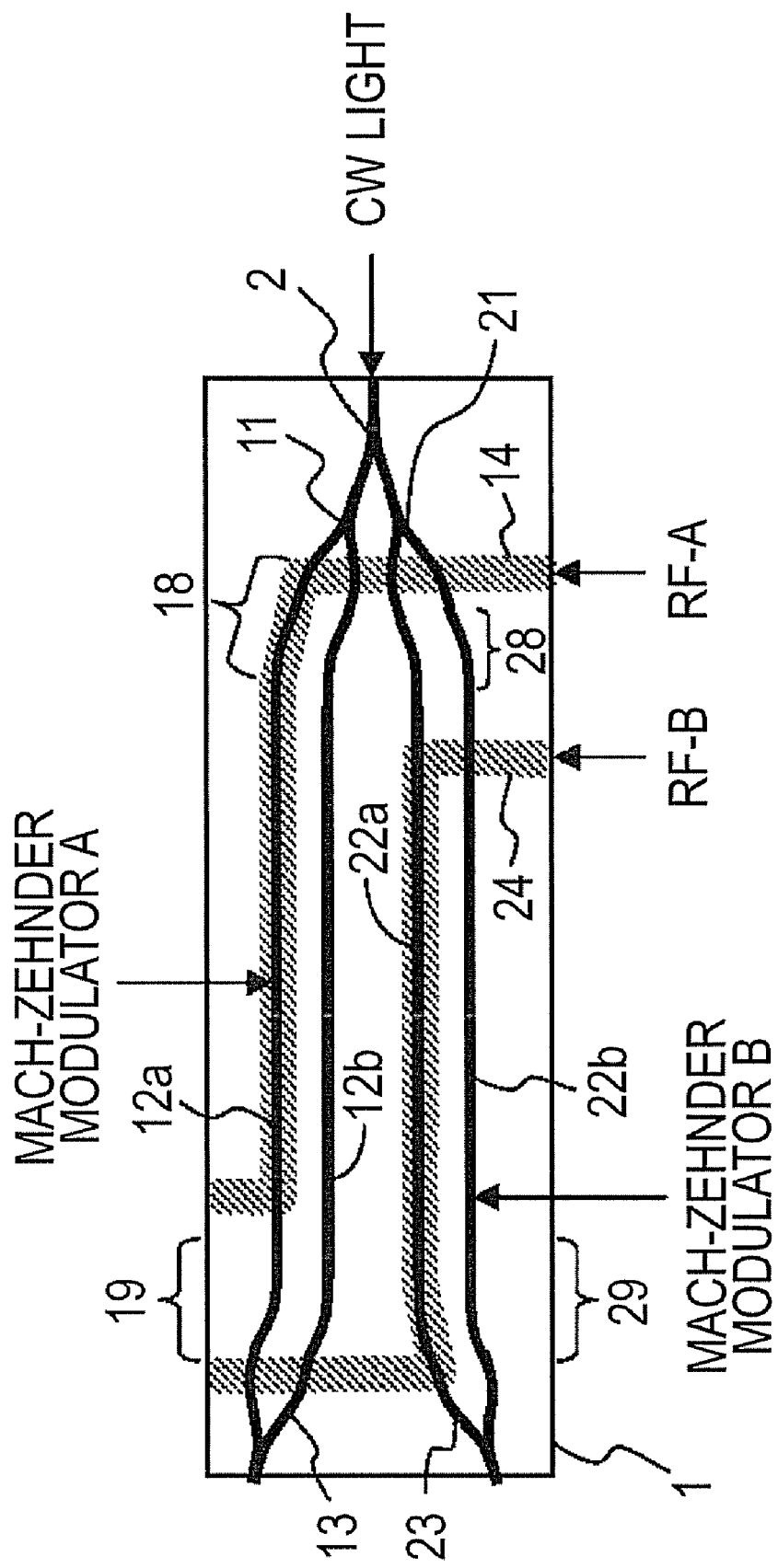
FIG. 8 is a diagram illustrating the configuration of an optical device according to a fifth embodiment.

FIG. 8 is a diagram illustrating the configuration of an optical device according to the fifth embodiment In the fifth embodiment, pair of waveguides are curved both in an input region and an output region so that a set of arms of each Mach-Zehnder modulator may have the same optical path length.

In a Mach-Zehnder modulator A, pair of waveguides 12 (12a, 12b) are curved both in an input region 18 and an output region 19. In this example, the curvature of the pair of waveguides 12 in the output region 19 is equal to the curvature of the pair of waveguides 12 in the input region 18. In the output region 19, however, the pair of waveguides 12 are curved in a direction opposite to that of the pair of waveguides 12 in the input region 18. In addition, the pair of waveguides 12 are formed so that the orientation of a splitter 11 is the same or substantially the same as the orientation of a combiner 13. The orientation of the combiner 13 may be, but not particularly limited to, for example, the direction in which an output waveguide of the combiner 13 extends. With the above configuration, the optical path lengths of the set of arms of the Mach-Zehnder modulator A may be made equal.

The Mach-Zehnder modulator B has basically the same configuration as the Mach-Zehnder modulator A. That is, in an input region 28 and an output region 29, pair of waveguides 22 (22a, 22b) of the Mach-Zehnder modulator B are also curved in opposite directions. In this example, the curvatures of the pair of waveguides 12 and 22 in the output regions 19 and 29 are the same or substantially the same.

Sixth Embodiment

Figure 9:
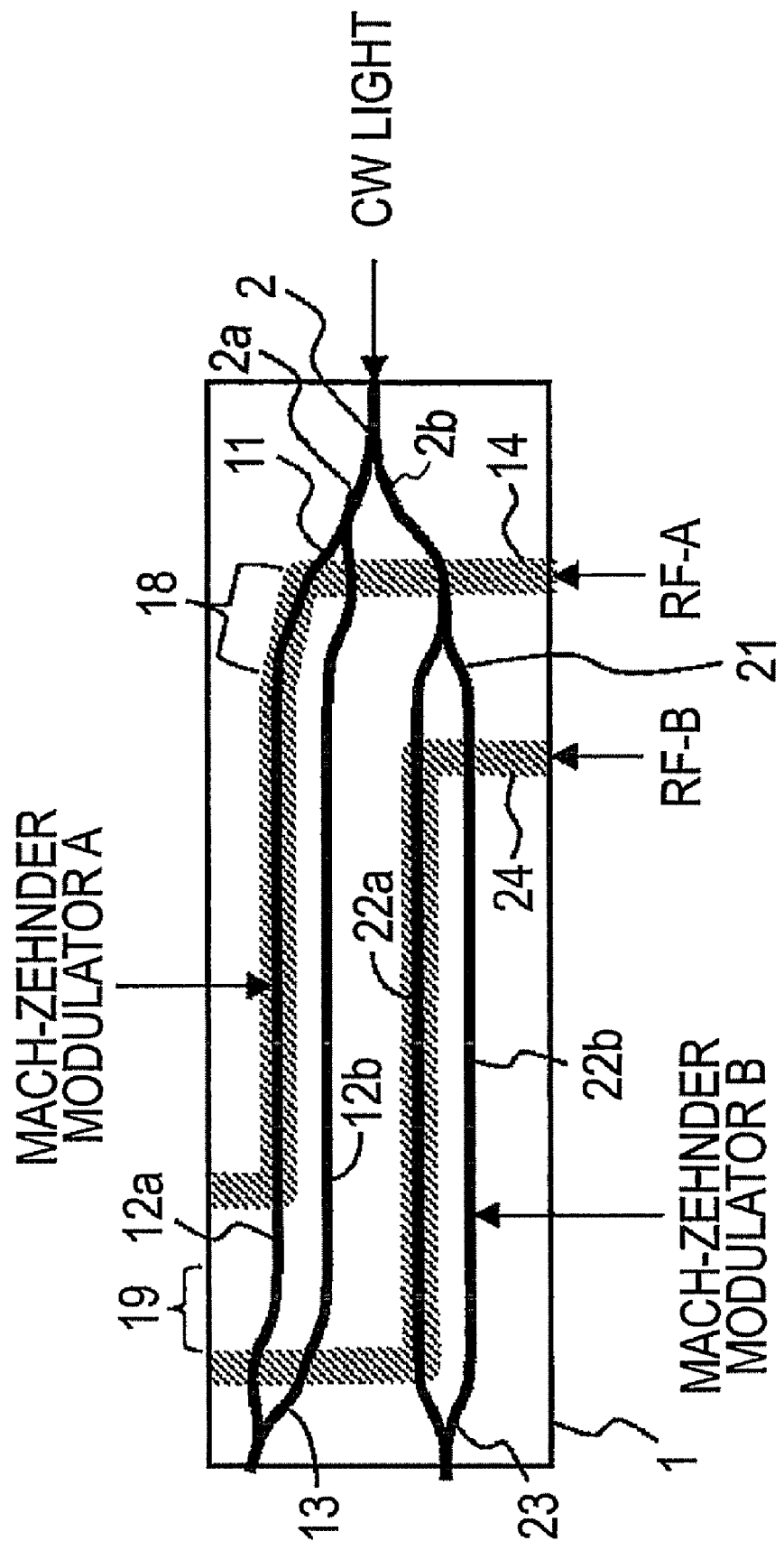
FIG. 9 is a diagram illustrating the configuration of an optical device according to a sixth embodiment.

FIG. 9 is a diagram illustrating the configuration of an optical device according to the sixth embodiment. In the sixth embodiment, a set of Mach-Zehnder modulators A and B have different configurations.

In FIG. 9, splitters 11 and 21 are formed at different positions on a substrate 1 in the longitudinal direction thereof. Specifically, the splitter 11 of the Mach-Zehnder modulator A is disposed near a branching point of an input branching waveguide 2, and the splitter 21 of the Mach-Zehnder modulator B is disposed slightly away from the branching point of the input branching waveguide 2. In other words, an optical waveguide 2b is longer than an optical waveguide 2a. Thus, as in the configuration of the fifth embodiment illustrated in FIG. 8, the Mach-Zehnder modulator A is configured such that the splitter 11 and a combiner 13 are disposed obliquely with respect to the longitudinal direction of the substrate 1 and that pair of waveguides 12 are curved in an input region 18 and an output region 19. Since the optical waveguide 2b, which is coupled to the Mach-Zehnder modulator B, is longer than the optical waveguide 2a, a desired angle of bend may be obtained without increasing the curvature of the optical waveguide 2b. That is, the optical waveguide 2b may be sufficiently bent so that the orientation of the splitter 21 may be made parallel to the longitudinal direction of the substrate 1. Therefore, unlike the pair of waveguides 12, pair of waveguides 22 of the Mach-Zehnder modulator B may be not curved.

In the sixth embodiment, therefore, the configurations of the Mach-Zehnder modulators A and B are different from each other. Preferably, however, the interaction length of the Mach-Zehnder modulators A and B are the same.

Figure 10:
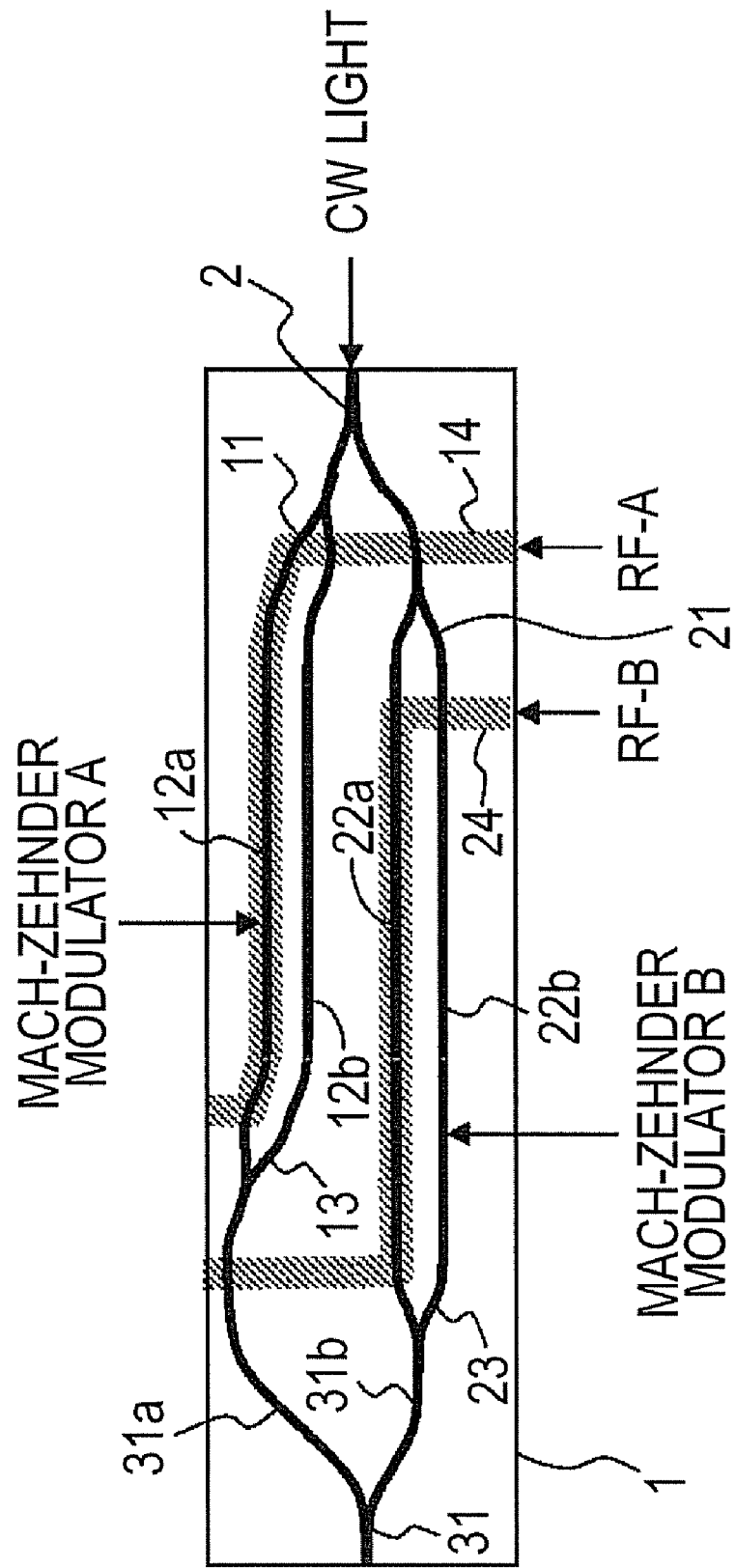
FIG. 10 is a diagram illustrating the configuration of an optical device according to a seventh embodiment.
Figure 11:
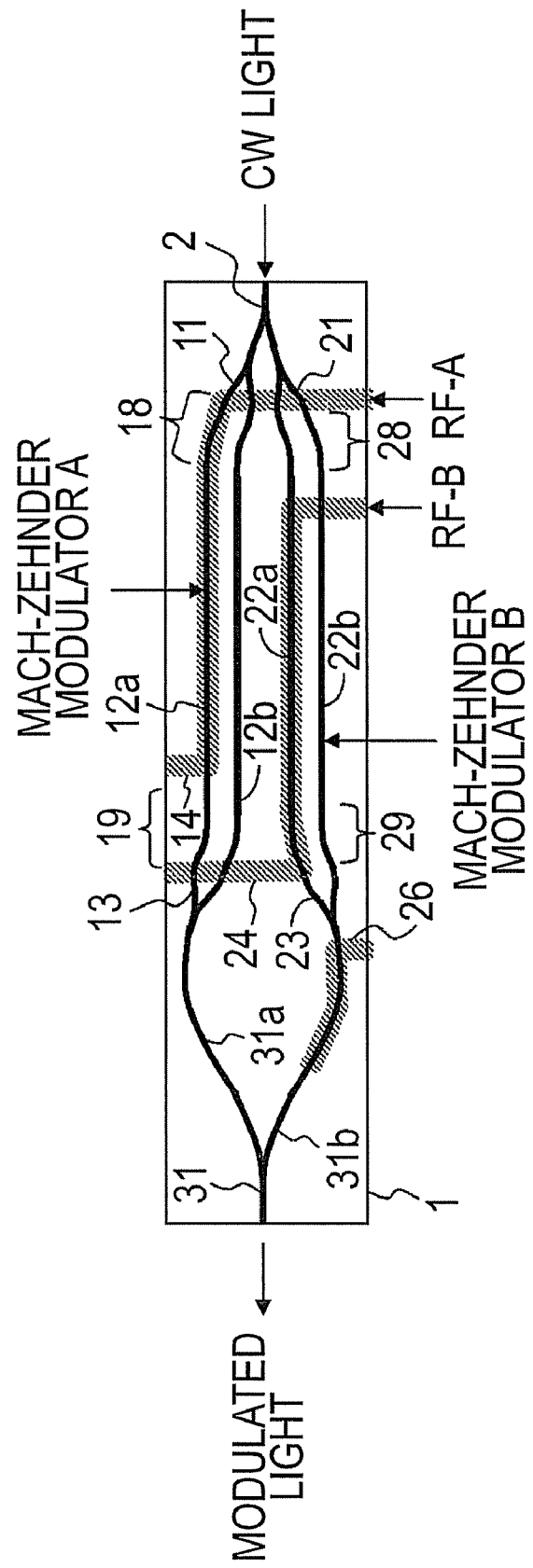
FIG. 11 is a diagram illustrating the configuration of an optical device according to an eighth embodiment.

FIGS. 10 and 11 are diagrams illustrating the configurations of optical devices according to seventh and eighth embodiments, respectively. In the seventh and eighth embodiments, outputs of a set of Mach-Zehnder modulators are combined and output. The optical devices of the seventh and eighth embodiments may be applied to, for example, a QPSK (including DQPSK) modulator.

Seventh Embodiment

As illustrated in FIG. 10, the optical device of the seventh embodiment includes an input branching waveguide 2, Mach-Zehnder modulators A and B, and an output combining waveguide 31. In this example, the input branching waveguide 2 and the Mach-Zehnder modulators A and B basically have a configuration similar to that illustrated in FIG. 9. Specifically, splitters 11 and 21 are disposed at different positions in the longitudinal direction of a substrate 1. In the Mach-Zehnder modulator A, furthermore, the splitter 11 and a combiner 13 are disposed obliquely with respect to the longitudinal direction of the substrate 1. In the Mach-Zehnder modulator B, on the other hand, the splitter 21 and a combiner 23 are disposed parallel to the longitudinal direction of the substrate 1. Therefore, in a portion where the interaction region ends, signal electrodes 14 and 24 extend in different directions. Specifically, in a portion where the interaction region ends in the Mach-Zehnder modulator A, the signal electrode 14 extends in a direction oblique to the side surfaces of the substrate 1. In a portion where the interaction region ends in the Mach-Zehnder modulator B, on the other hand, the signal electrode 24 extends in parallel to the side surfaces of the substrate 1. Note that, unlike the configuration illustrated in FIG. 9, the combiners 13 and 23 are located at different positions in the longitudinal direction of the substrate 1.

The output combining waveguide 31 includes optical waveguides 31a and 31b for propagating the output light of the Mach-Zehnder modulators A and B, respectively. In order to implement a QPSK modulator, the phase difference between an optical path reaching the combining point through the Mach-Zehnder modulator A and an optical path reaching the combining point through the Mach-Zehnder modulator B is designed to be equal to $(2n+1)\pi/2$, where n is an integer including zero. Accordingly, the optical waveguides 31a and 31b are designed so as to meet the above phase difference requirement. For example, the optical waveguide 31a is curved so as to have a phase shift element for providing the phase difference described above. Optical signals obtained by the Mach-Zehnder modulators A and B are combined using the output combining waveguide 31 and output.

In the seventh embodiment, therefore, the Mach-Zehnder modulator A is located nearer the input end than the Mach-Zehnder modulator B, and a phase shift element is implemented by the optical waveguide 31a in a region that is available on the output side of the Mach-Zehnder modulator A. Reduction in size of a QPSK modulator may therefore be achieved.

Eighth Embodiment

As illustrated in FIG. 11, the optical device of the eighth embodiment includes an input branching waveguide 2, Mach-Zehnder modulators A and B, and an output combining waveguide 31. In this example, the input branching waveguide 2 and the Mach-Zehnder modulators A and B basically have a configuration similar to that illustrated in FIG. 8. Specifically, splitters 11 and 21 are disposed close to each other. Furthermore, pair of waveguides 12 are curved in an input region 18 and an output region 19, and pair of waveguides 22 are curved in an input region 28 and an output region 29.

The output combining waveguide 31 includes optical waveguides 31a and 31b for propagating the output light of the Mach-Zehnder modulators A and B, respectively. A DC electrode 26 is formed so as to overlap the optical waveguide 31b. The optical path length of the optical waveguide 31b is adjusted according to the voltage to be applied to the DC electrode 26. In this case, in order to implement a QPSK modulator, as in the configuration of the seventh embodiment illustrated in FIG. 10, the DC voltage is controlled so that the phase difference between an optical path reaching the combining point through the Mach-Zehnder modulator A and an optical path reaching the combining point through the Mach-Zehnder modulator B may be set to $(2n+1)\pi/2$.

In the eighth embodiment, therefore, DC bias control is implemented (in the embodiment, a phase shift element is controlled) using the output combining waveguide 31 coupled to the output sides of the Mach-Zehnder modulators A and B. Therefore, reduction in size of a QPSK modulator may be achieved. In a configuration in which a DC electrode is disposed on the output side of a Mach-Zehnder modulator, the space between the pair of waveguides 12 and 22 may be reduced in a region where the DC electrode is formed.

Ninth Embodiment

Figure 12:
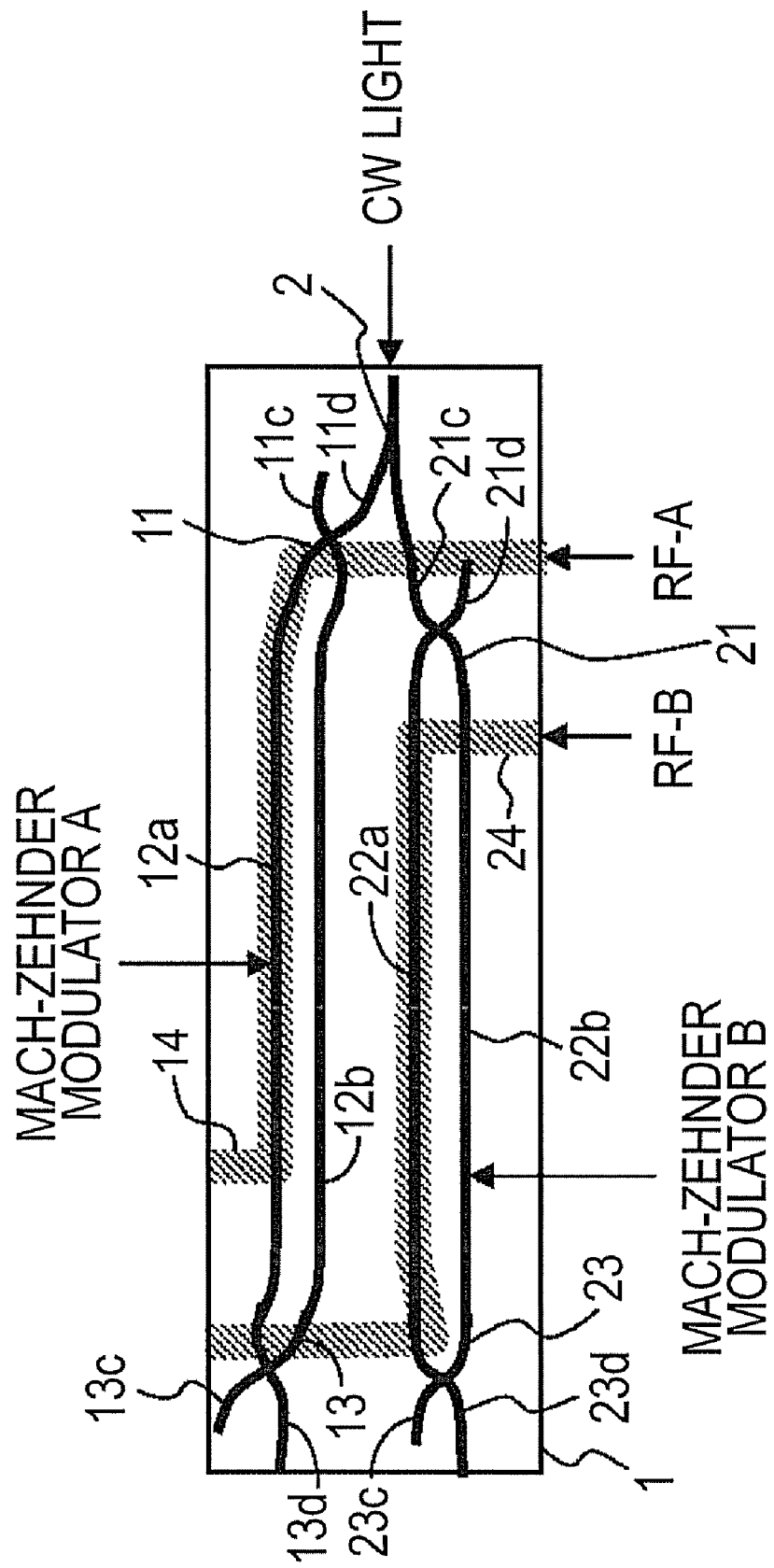
FIG. 12 is a diagram illustrating the configuration of an optical device according to a ninth embodiment.

FIG. 12 is a diagram illustrating the configuration of an optical device according to a ninth embodiment. In the ninth embodiment, a splitter and a combiner in each Mach-Zehnder modulator are individually implemented by optical couplers. Specifically, splitters 11 and 21 and combiners 13 and 23 may be 2×2 optical couplers.

The 2×2 optical coupler 11 includes a set of input ports 11c and 11d. The input port 11d is formed nearer a branching point of an input branching waveguide 2 than the input port 11c. The 2×2 optical coupler 21 includes a set of input ports 21c and 21d. The input port 21c is formed nearer the branching point of the input branching waveguide 2 than the input port 21d. The input branching waveguide 2 is coupled to the input ports 11d and 21c.

The 2×2 optical coupler 13 includes a set of output ports 13c and 13d. A modulated light A obtained by a Mach-Zehnder modulator A is output through the output port 13d. Similarly, the 2×2 optical coupler 23 includes a set of output ports 23c and 23d. A modulated light B obtained by a Mach-Zehnder modulator B is output through the output port 23d.

In the example illustrated in FIG. 12, the Mach-Zehnder modulator A is configured using a through port while the Mach-Zehnder modulator B is configured using a cross port. In this case, the Mach-Zehnder modulators A and B may have different extinction ratios. To avoid any inconvenience caused thereby, the input branching waveguide 2 may be coupled to the input port 11c of the splitter 11 and the input port 21c of the splitter 21. Therefore, both the Mach-Zehnder modulators A and B are configured using a cross port. Alternatively, both the Mach-Zehnder modulators A and B may be configured using a through port.

The optical devices illustrated in FIGS. 3 to 12 are configured such that two Mach-Zehnder modulators A and B are provided in the surface region of the substrate 1. However, the embodiments described above are not limited to this configuration. That is, the optical device according to the embodiments may include three or more Mach-Zehnder modulators. In this case, the orientations of splitters of the Mach-Zehnder modulators are sequentially set in accordance with the disposed positions of the corresponding Mach-Zehnder modulators in such a manner that each of the splitters is disposed to spread out in a fan-like form.

Tenth Embodiment

FIG. 13 is a diagram illustrating the configuration of a polarization-multiplexing modulator according. In FIG. 13, an optical device 41 may correspond to, for example, any of the optical devices of the first to sixth and ninth embodiments described above. That is, the optical device 41 includes an input branching waveguide 2 and Mach-Zehnder modulators A and B, and generates an optical signal A corresponding to a data signal A and an optical signal B corresponding to a data signal B. A polarization-multiplexing coupler 42 performs polarization-multiplexing on the optical signals A and B.

In the above configuration, the optical device 41 may be configured to be compact without causing any degradation in modulation characteristics. Therefore, a polarization-multiplexing modulator of the embodiment may also achieve desired modulation characteristics and compact design.

Eleventh Embodiment

FIG. 14 is a diagram illustrating the configuration of an optical transmitter. The optical transmitter may be used in, for example, an optical fiber communication system. A data generator 43 generates transmission data (data signals A and B). An optical device 41 may correspond to, for example, any of the optical devices of the first to ninth embodiments described above.

With the above configurations described in embodiments, a compact optical device including a plurality of Mach-Zehnder modulators is provided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An optical device comprising:
   a plurality of Mach-Zehnder modulators; and
   an input branching waveguide to split an input light so as to direct the split light to the plurality of Mach-Zehnder modulators,
   wherein each Mach-Zehnder modulator of the plurality of Mach-Zehnder modulators comprises:
      a splitter coupled to the input branching waveguide;
      a pair of waveguides coupled to the splitter;
      a combiner coupled to the pair of waveguides; and
      a signal electrode to apply signals to the pair of waveguides;
   wherein the splitter of each Mach-Zehnder modulator is disposed in a different orientation than the splitter of each of the other Mach-Zehnder modulators.

2. The optical device according to claim 1, wherein at least one of the plurality of Mach-Zehnder modulators is disposed obliquely with respect to side surfaces of the substrate.

3. The optical device according to claim 1, wherein waveguides in an input region of the pair of waveguides of each Mach-Zehnder modulator are curved so that waveguides in strait portions of the pair of waveguides of the plurality of Mach-Zehnder modulators are disposed in parallel or substantially in parallel to each other.

4. The optical device according to claim 3, wherein the waveguides in the input region of the pair of waveguides of each Mach-Zehnder modulator have same curvatures or substantially same curvatures to each other.

5. The optical device according to claim 3, wherein, for each Mach-Zehnder modulator, the combiner of the respective Mach-Zehnder modulator has a same orientation or a substantially same orientation as the splitter of the respective Mach-Zehnder modulator.

6. The optical device according to claim 5, wherein waveguides in an output region of the pair of waveguides of each Mach-Zehnder modulator are curved.

7. The optical device according to claim 6, wherein the waveguides in the output region of the pair of waveguides of each Mach-Zehnder modulator have same curvatures or substantially same curvatures to each other.

8. The optical device according to claim 1, wherein the signal electrode of one Mach-Zehnder modulator of the plurality of Mach-Zehnder modulators is formed in a beginning portion of an interaction region so as to extend to a different direction from the signal electrode of another Mach-Zehnder modulator of the plurality of Mach-Zehnder modulators.

9. The optical device according to claim 1, further comprising:
a DC electrode applying a DC voltage over the pair of waveguides, being disposed on an input side of the signal electrode in at least one of the plurality of Mach-Zehnder modulators.

10. The optical device according to claim 3, further comprising:
a delay portion to adjust an optical path length, formed on one optical path of the pair of waveguides in at least one of the plurality of Mach-Zehnder modulators.

11. The optical device according to claim 3, wherein one waveguide length from an output end of the pair of waveguides to a combining point of the combiner is differ from the other waveguide length in at least one of the plurality of Mach-Zehnder modulators.

12. The optical device according to claim 1, wherein the splitter of a first Mach-Zehnder modulator of the plurality of Mach-Zehnder modulators is disposed obliquely with respect to side surfaces of a substrate on which the plurality of Mach-Zehnder modulators are formed, the splitter of a second Mach-Zehnder modulator of the plurality of Mach-Zehnder modulators is disposed in pair of with respect to side surfaces of the substrate, in case of that a waveguide length from a branching point of the input branching waveguide to a branching point of the splitter of the first Mach-Zehnder modulator is shorter than a waveguide length from the branching point of the input branching waveguide to a branching point of the splitter of the second Mach-Zehnder modulator.

13. The optical device according to claim 1, further comprising:
an output combining waveguide to combine output light of the plurality of Mach-Zehnder modulators;
wherein the signal electrode of one Mach-Zehnder modulator of the plurality of Mach-Zehnder modulators is formed in an ending portion of an interaction region so as to extend to a different direction from the signal electrode of another Mach-Zehnder modulator of the plurality of Mach-Zehnder modulators.

14. The optical device according to claim 1, further comprising:
an output combining waveguide to combine output light of the plurality of Mach-Zehnder modulators;
wherein an installation position of the combiner of one Mach-Zehnder modulator of the plurality of Mach-Zehnder modulators is differ from the installation position of the combiner of another Mach-Zehnder modulator of the plurality of Mach-Zehnder modulators on a direction from the input branching waveguide to the output combining waveguide.

15. The optical device according to claim 1, further comprising:
an output combining waveguide to combine output light of first and second Mach-Zehnder modulators of the plurality of Mach-Zehnder modulators; and
a DC electrode applying a DC voltage over a waveguide on where the output light of the first Mach-Zehnder modulator is propagated to the output combining waveguide.

16. The optical device according to claim 1, wherein the splitter is a 2×2 optical coupler.

17. The optical device according to claim 16, wherein an input port closer to the input branching waveguide couples to the input branching waveguide.

18. The optical device according to claim 16, wherein the splitter is a 2×2 optical coupler and each Mach-Zehnder modulator couples to the 2×2 optical coupler so as to be configured using cross port.

19. A polarization multiplexing modulator comprising:
an optical device including first and second Mach-Zehnder modulators and an input branching waveguide to split an input light so as to direct the split light to the first and second Mach-Zehnder modulators, the optical device being formed on a substrate made of a material having electro-optical effects; and
a polarization multiplexing coupler to polarization-multiplex output light of the first and second Mach-Zehnder modulators;
each of the first and second Mach-Zehnder modulators comprising:
a splitter coupled to the input branching waveguide;
pair of waveguides coupled to the splitter;
a combiner coupled to the pair of waveguides; and
a signal electrode to apply signals to the pair of waveguides;
wherein the splitter of the first Mach-Zehnder modulator is disposed in a different orientation than the splitter of the second Mach-Zehnder modulator.

20. A QPSK modulator comprising:
first and second Mach-Zehnder modulators;
an input branching waveguide to split an input light so as to direct the split light to the first and second Mach-Zehnder modulators; and
an output combining waveguide to combine output light of first and second Mach-Zehnder modulators;
each of the first and second Mach-Zehnder modulators comprising:
a splitter coupled to the input branching waveguide;
pair of waveguides coupled to the splitter;
a combiner coupled to the pair of waveguides; and
a signal electrode to apply signals to the pair of waveguides;
wherein the splitter of the first Mach-Zehnder modulator is disposed in a different orientation than the splitter of the second Mach-Zehnder modulator.

21. An optical device comprising:
an input branching waveguide to split an input light into first and second split lights;
a first Mach-Zehnder modulator to receive the first split light and comprising:
a splitter to split the received first split light into first and second lights;
a first waveguide to receive the first light so that the first light travels through the first waveguide;
a second waveguide to receive the second light so that the second light travels through the second waveguide;

a combiner to combine the first light after traveling through the first waveguide and the second light after traveling through the second waveguide; and
a signal electrode to apply signals to the first and second waveguides; and
a second Mach-Zehnder modulator to receive the second split light and comprising:
a splitter to split the received second split light into third and fourth lights;
a third waveguide to receive the third light so that the third light travels through the third waveguide;
a fourth waveguide to receive the fourth light so that the fourth light travels through the fourth waveguide;
a combiner to combine the third light after traveling through the third waveguide and the fourth light after traveling through the fourth waveguide; and
a signal electrode to apply signals to the third and fourth waveguides; and
wherein the splitter of the first Mach-Zehnder modulator has a different orientation than the splitter of the second Mach-Zehnder modulator.

* * * * *